United States Patent
Li et al.

(10) Patent No.: US 12,302,148 B2
(45) Date of Patent: May 13, 2025

(54) RADIO LINK MONITORING METHOD AND APPARATUS AND SYSTEM IN SIDELINK

(71) Applicant: FUJITSU LIMITED, Kawasaki (JP)

(72) Inventors: Guorong Li, Beijing (CN); Jian Zhang, Beijing (CN); Pengyu Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 419 days.

(21) Appl. No.: 17/547,367

(22) Filed: Dec. 10, 2021

(65) Prior Publication Data

US 2022/0104058 A1 Mar. 31, 2022

Related U.S. Application Data

(63) Continuation of application No. PCT/CN2019/095405, filed on Jul. 10, 2019.

(51) Int. Cl.
*H04W 24/10* (2009.01)
*H04W 4/40* (2018.01)
*H04W 24/08* (2009.01)

(52) U.S. Cl.
CPC ............ *H04W 24/10* (2013.01); *H04W 4/40* (2018.02); *H04W 24/08* (2013.01)

(58) Field of Classification Search
None
See application file for complete search history.

(56) References Cited

U.S. PATENT DOCUMENTS

| 11,653,233 B2* | 5/2023 | Wu | H04W 56/0035 |
| | | | 370/329 |
| 11,902,814 B2* | 2/2024 | Wu | H04W 16/14 |
| 12,069,493 B2* | 8/2024 | Wang | H04B 17/309 |
| 2016/0007252 A1* | 1/2016 | Larmo | H04W 76/28 |
| | | | 370/332 |
| 2017/0063595 A1 | 3/2017 | Ma et al. | |
| 2017/0118671 A1 | 4/2017 | Lee et al. | |
| 2017/0245245 A1 | 8/2017 | Kim et al. | |
| 2018/0115930 A1 | 4/2018 | Belleschi et al. | |
| 2018/0132304 A1* | 5/2018 | Lee | H04W 76/38 |

(Continued)

FOREIGN PATENT DOCUMENTS

| CN | 108605253 A | 9/2018 |
| CN | 108633074 A | 10/2018 |

(Continued)

OTHER PUBLICATIONS

International Search Report and Written Opinion of the International Searching Authority issued by the China National Intellectual Property Administration for corresponding International Patent Application No. PCT/CN2019/095405, mailed on Apr. 3, 2020, with an English translation.

(Continued)

*Primary Examiner* — Brian S Roberts
(74) *Attorney, Agent, or Firm* — Myers Wolin, LLC (57) ABSTRACT

A radio link monitoring method in a sidelink, applicable to a terminal equipment. The method includes: reporting by a physical layer to a higher layer a state of at least one sidelink and sidelink information to which the state corresponds, and performing by the higher layer operations related to radio link monitoring or a radio link failure according to the sidelink information.

20 Claims, 4 Drawing Sheets

201 a physical layer reports to a higher layer a state of at least one sidelink and sidelink information to which the state corresponds

202 the higher layer performs operations related to radio link monitoring or a radio link failure according to the sidelink information (56) References Cited

U.S. PATENT DOCUMENTS

| | | | |
|---|---|---|---|
| 2018/0279275 A1 | 9/2018 | Chen et al. | |
| 2018/0317278 A1 | 11/2018 | Fujishiro et al. | |
| 2020/0145091 A1 | 5/2020 | Luo et al. | |
| 2020/0229007 A1* | 7/2020 | Jung | H04W 72/04 |
| 2020/0252990 A1* | 8/2020 | Ganesan | H04W 76/14 |
| 2022/0191962 A1* | 6/2022 | Di Girolamo | H04L 5/0053 |

FOREIGN PATENT DOCUMENTS

| | | |
|---|---|---|
| CN | 108848523 A | 11/2018 |
| CN | 109565333 A | 4/2019 |
| EP | 3 499 747 A1 | 6/2019 |
| JP | 2017-515425 A | 6/2017 |
| WO | 2018/113946 A1 | 6/2018 |

OTHER PUBLICATIONS

Vivo, "Open issues for Sidelink link failure and release", Agenda Item: 11.4.5, 3GPP TSG-RAN WG2 Meeting #106, R2-1905845 (revision of R2-1903638), Reno, USA, May 13-17, 2019.

First Notification of Office Action and Search Report issued by the China National Intellectual Property Administration for corresponding Chinese Patent Application No. 201980097200.4, mailed on Jul. 1, 2023, with an English translation.

Notice of Reasons for Refusal issued by the Japan Patent Office for corresponding Japanese Patent Application No. 2021-578056, mailed on Nov. 29, 2022, with an English translation.

Oppo, "Discussion on RLM for V2X", Agenda Item: 11.4.5, 3GPP TSG-RAN WG2 Meeting #106, R2-1905574, Reno, US, May 13-17, 2019.

* cited by examiner

FIG. 1

201 a physical layer reports to a higher layer a state of at least one sidelink and sidelink information to which the state corresponds

202 the higher layer performs operations related to radio link monitoring or a radio link failure according to the sidelink information

401 a network device transmits configuration information to a terminal equipment via dedicated signaling or system information, the configuration information including values of a counter and/or a timer related to radio link monitoring related to a sidelink, the values of a counter and/or a timer related to radio link monitoring related to a sidelink being configured regarding to a unicast link or regarding to a peer terminal equipment or regarding to a service flow

RADIO LINK MONITORING METHOD AND APPARATUS AND SYSTEM IN SIDELINK

CROSS-REFERENCE TO RELATED APPLICATION

This application is a continuation application of International Application PCT/CN2019/095405 filed on Jul. 10, 2019 and designated the U.S., the entire contents of which are incorporated herein by reference.

FIELD

This disclosure relates to the field of communication technologies.

BACKGROUND

Vehicle communication services, denoted by V2X (vehicle-to-everything communication) services, may include multiple types: V2V (vehicle-to-vehicle communication), V2I (vehicle-to-infrastructure communication), and V2P (vehicle-to-pedestrian communication), etc. The V2X services may be provided via a PC5 interface and/or a Uu interface. The V2X services transmitted via the PC5 interface are provided by V2X sidelink communication, which is a communication mode in which terminal equipments may directly communicate with each other via the PC5 interface. In long term evolution (LTE) or New Radio (NR), the terminal equipments support this communication mode when they are within or outside the coverage of the network.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that the Third Generation Partnership Project (3GPP) agreed on NR V2X that for unicast links, detection of radio link monitoring (RLM)/radio link failure (RLF) on PC5 interface is supported, and the following conclusions were made:
1) even if irregular transmission of sidelink signals occurs, it is assumed that a physical layer provides periodic in-synchronization (IS)/out-of-synchronization (OOS) indications to an upper layer; and
2) from a perspective of RAN 2, both equipment of a transmitting end and equipment of a receiving end perform an RLM/RLF detection mechanism.

Therefore, when a terminal equipment transmits V2X services to multiple terminal equipments or a terminal equipment receives V2X services transmitted by multiple terminal equipments, the terminal equipment may need to perform RLM/RLF detection on more than one PC5 connections or PC5 radio links. If in-synchronization/out-of-synchronization indications reported by the physical layer for different peer terminal equipments are mixed together, the terminal equipment will not be able to perform RLM/RLF detection correctly.

In order to solve at least one of the above problems or other similar problems, embodiments of this disclosure provide a radio link monitoring method and apparatus and a system in a sidelink, in which in performing RLM/RLF detection on a PC5 interface, information of equipment of a transmitting end or equipment of a receiving end or a PC5 radio link or a PC5 service flow, etc., is taken into account, so as to distinguish in-synchronization/out-of-synchronization indications or other link status for different equipment of transmitting end or equipment of receiving end or PC5 radio links or PC5 service flows, etc., thereby performing RLM/RLF detection correctly.

According to a first aspect of the embodiments of this disclosure, there is provided a radio link monitoring method in a sidelink, applicable to a terminal equipment, wherein the method includes:
 a physical layer reports to a higher layer a state of at least one sidelink and sidelink information to which the state corresponds, and
 the higher layer performs operations related to radio link monitoring or a radio link failure according to the sidelink information.

According to a second aspect of the embodiments of this disclosure, there is provided a configuration method for a counter and a timer, applicable to a network device, wherein the method includes:
 the network device transmits configuration information to a terminal equipment via dedicated signaling or system information, the configuration information including values of a counter and/or a timer related to radio link monitoring related to a sidelink, the values of a counter and/or a timer related to radio link monitoring related to a sidelink being configured regarding to a unicast link or regarding to a peer terminal equipment or regarding to a service flow.

According to a third aspect of the embodiments of this disclosure, there is provided a radio link monitoring apparatus in a sidelink, configured in a terminal equipment, wherein the apparatus includes:
 a reporting unit configured to report in a physical layer to a higher layer a state of at least one sidelink and sidelink information to which the state corresponds; and
 a processing unit configured to perform in the higher layer operations related to radio link monitoring or a radio link failure according to the sidelink information.

According to a fourth aspect of the embodiments of this disclosure, there is provided a configuration apparatus for a counter and a timer, applicable to a network device, wherein the apparatus includes:
 a transmitting unit configured to transmit configuration information to a terminal equipment via dedicated signaling or system information, the configuration information including values of a counter and/or a timer related to radio link monitoring related to a sidelink, the values of a counter and/or a timer related to radio link monitoring related to a sidelink being configured regarding to a unicast link or regarding to a peer terminal equipment or regarding to a service flow.

According to a fifth aspect of the embodiments of this disclosure, there is provided a terminal equipment, including the apparatus as described in the third aspect.

According to a sixth aspect of the embodiments of this disclosure, there is provided a network device, including the apparatus as described in the fourth aspect.

According to a seventh aspect of the embodiments of this disclosure, there is provided a communication system, including the terminal equipment as described in the fifth aspect and the network device as described in the sixth aspect.

According to another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a storage medium storing a computer readable program, which will cause a computer to carry out the method described in the first aspect in a terminal equipment.

According to yet another aspect of the embodiments of this disclosure, there is provided a computer readable program, which, when executed in a network device, will cause a computer to carry out the method described in the second aspect in the network device.

According to still another aspect of the embodiments of this disclosure, there is provided a storage medium storing a computer readable program, which will cause a computer to carry out the method described in the second aspect in a network device.

An advantage of the embodiments of this disclosure exists in that with the methods, apparatuses or system of the embodiments of this disclosure, when the physical layer reports a state of the sidelink to the higher layer, it also reports sidelink information to which the state corresponds. Thus, radio link quality to which different peer user equipments or unicast links or service flows correspond may be distinguished, thereby RLM/RLF detection for different peer user equipments or unicast links or service flows may be performed correctly.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION OF THE DISCLOSURE

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain," "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to," the term "based on" should be understood as "at least partially based on," except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device," for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 1:
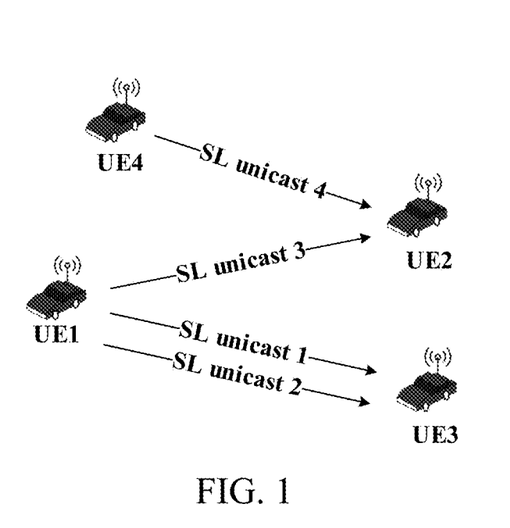
FIG. 1 is schematic diagram of a scenario of an embodiment of this disclosure.

FIG. 1 is schematic diagram of a scenario of an embodiment of this disclosure. As shown in FIG. 1, UE 2 receives V2X unicast services on a sidelink from UE 1 and UE 4, and needs to distinguish RLM/RLF detection on a radio link (SL unicast 3) between it and UE 1 and RLM/RLF detection on a radio link (SL unicast 4) between it and UE 4, so as to perform correct link state detection to the two unicast links (SL unicast 3 and SL unicast 4). In addition, there exist two sidelink unicast links between UE 1 and UE 3 (a UE pair), namely SL unicast 1 and SL unicast 2. For the RLM/RLF detection of this UE pair, the detection may only be performed for the peer UE, because radio channel quality of this UE pair may represent channel quality of all unicast links between the two UEs. If relative speeds of the two UEs are relatively large or different unicast link transmissions are relatively scattered temporally, there may exist wireless channel quality differences between different unicast links, unicast links or service quality of QoS flows in unicast links need to be further distinguished, and operations related to RLM/RLF may be respectively performed on each unicast link or QoS flow.

Various implementations of this disclosure shall be described below with reference to the accompanying drawings. These implementations are exemplary only, and are not intended to limit to this disclosure.

Embodiment of the First Aspect

Figure 2:
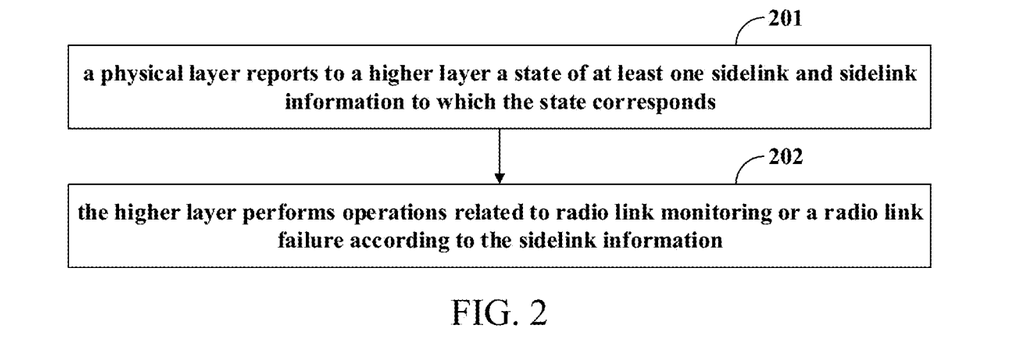
FIG. 2 is a schematic diagram of the method of the first aspect of the embodiments of this disclosure.

The embodiment of the first aspect of the present application provides a radio link monitoring method in a sidelink, applicable to a terminal equipment. FIG. 2 is a schematic diagram of the radio link monitoring method in a sidelink of this embodiment. Referring to FIG. 2, the method includes:

operation 201: a physical layer reports to a higher layer a state of at least one sidelink and sidelink information to which the state corresponds; and operation 202: the higher layer performs operations related to radio link monitoring (RLM) or a radio link failure (RLF) according to the sidelink information.

In the embodiment of this disclosure, the physical layer reports the sidelink information to which the state corresponds while reporting the state of the sidelink to the higher layer, which is helpful to distinguish radio quality of different sidelinks, so that the terminal equipment correctly performs operations related to RLM and RLF. This method is simple to implement and has less impact on standards.

In the embodiment of this disclosure, in operation 201, the above state may be an in-synchronization indication or an out-of-synchronization indication, may be available for transmission or unavailable for transmission, and may be satisfying a QoS requirement or not satisfying a QoS requirement, which are not limited in this embodiment, and all states are covered by this application as long as they can reflect states of sidelinks. Furthermore, in step 201, in one or more embodiments, the sidelink information includes at least one of the following: layer 1 identification (L1 ID) information, link information, sidelink service flow information, layer 2 identification (L2 ID) information, link identification information of an upper layer, and identification information of a terminal equipment.

In at least one embodiment, if the physical layer reports the above layer 1 identification information in operation 201, in operation 202, the higher layer maps the layer 1 identifier to the corresponding layer 2 identifier or the link identifier of the upper layer, and performs operations related to radio link monitoring or radio link failure for the layer 2 identifier or the link identifier of the upper layer.

In at least one embodiment, if the physical layer reports the above link information in operation 201, in operation 202, the higher layer maps the link identifier related to layer 1 indicated by the link information to the link identifier of the upper layer, and performs operations related to radio link monitoring or radio link failure for the link to which the link identifier of the upper layer corresponds, wherein the link identifier related to layer 1 may be pre-configured by the higher layer for the physical layer.

In at least one embodiment, if the physical layer reports the sidelink service flow information in operation 201, in operation 202, the higher layer performs operations related to radio link monitoring or radio link failure for the sidelink service flow.

In at least one embodiment, if the physical layer reports the layer 2 identification information in operation 201, in operation 202, the higher layer performs operations related to radio link monitoring or radio link failure for the link to which the layer 2 identifier corresponds.

In this embodiment, the physical layer not only knows the L1 ID, but also may obtain the L2 ID, and maps the L1 ID to the corresponding L2 ID.

In an embodiment, the physical layer obtains a correspondence relationship between the layer 2 identifier and the layer 1 identifier from the higher layer, and determines the layer 2 identifier according to the layer 1 identifier and the correspondence relationship. That is, the higher layer notifies the physical layer of the correspondence relationship between the L2 ID and the L1 ID, such as notifying a mapping table between the L2 ID and the L1 ID, thus, the physical layer obtains the above layer 2 identifier. Here, the higher layer may be an RRC layer or an MAC layer or a V2X layer, and this disclosure is not limited thereto.

In another embodiment, the physical layer determines the layer 2 identifier according to the layer 1 identifier and a preset rule. For example, the preset rule is that: lower X bits of the L2 ID are the L1 ID, and the remaining bits are filled with 0 or 1; and for another example, the preset rule is that: the L2 ID is obtained via the L1 ID and a certain function.

In at least one embodiment, if the physical layer reports the link identification information of the upper layer in operation 201, in operation 202, the higher layer performs operations related to radio link monitoring or radio link failure for the link to which the link identification information of the upper layer corresponds.

In this embodiment, the physical layer not only knows the L1 ID, but also may obtain the link identifier of the upper layer, and maps the link identifier related to the layer 1 to a corresponding link identifier of an upper layer.

In an embodiment, the physical layer obtains a correspondence relationship between the link identifier of the upper layer and the link identifier related to layer 1 from the higher layer (such as an RRC layer or an MAC layer or a V2X layer), and determines the link identifier of the upper layer according to the link identifier related to layer 1 and the correspondence relationship. Here, the correspondence relationship is similar to the correspondence relationship described above, and shall not be described herein any further.

In another embodiment, the physical layer determines the link identifier of the upper layer according to the link identifier related to the layer 1 and a preset rule. Here, the preset rule is similar to the preset rule described above, and shall not be described herein any further.

In at least one embodiment, if the physical layer reports the identification information of the terminal equipment in operation 201, in operation 202, the higher layer performs operations related to radio link monitoring or radio link failure for at least one unicast link or for at least one service flow to which the identification information of the terminal equipment corresponds.

In this embodiment, the identification information of the terminal equipment may be a context identifier of the terminal equipment; however, this disclosure is not limited thereto. The context identifier may be an identifier assigned by an access layer, or may be one of more than one L2 IDs.

Figure 3:
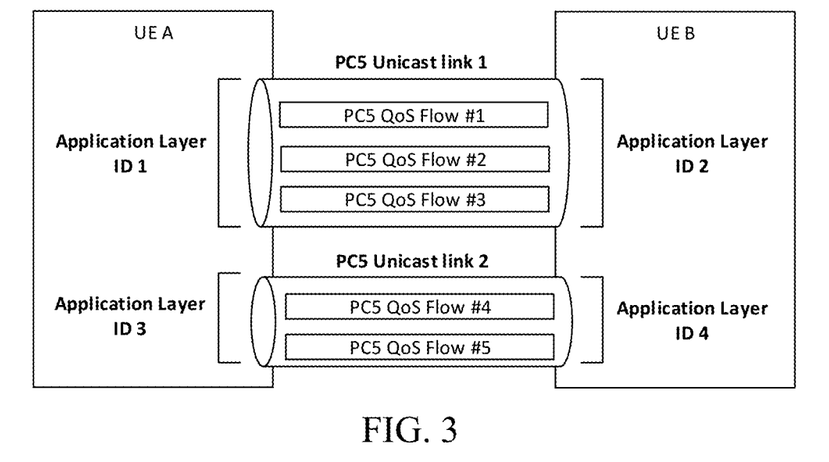
FIG. 3 is a schematic diagram of unicast links and service flows between UE A and UE B.

In this embodiment, different unicast links may have different requirements on services, and different service flows (QoS flows) in a unicast link may also have different requirements on services. FIG. 3 shows unicast links between UE A and UE B and different service flows in the unicast links. As shown in FIG. 3, there are two unicast links between UE A and UE B, namely, PC5 unicast link 1 and PC5 unicast link 2, wherein there are three service flows in PC5 unicast link 1, namely, PC5 QoS Flow #1, PC5 QoS Flow #2 and PC5 QoS Flow #3, and there are two service flows in PC5 unicast link 2, namely, PC5 QoS Flow #4 and PC5 QoS Flow #5. The higher layer may perform operations related to RLM/RLF on each unicast link respectively, or may perform operations related to RLM/RLF on each QoS Flow respectively. Performing operations related to RLM/RLF on each unicast link respectively is similar to that described in the previous embodiment, which shall not be described herein any further.

For example, for the terminal equipment of the receiving end, the physical layer may parse a QFI (QoS flow ID) or a PQI (PC5 5G QoS identifier, PC5 5QI) of a QoS flow or priority information carried in SCI (sidelink control information), so as to identify a corresponding QoS flow. For the terminal equipment of the transmitting end, the physical layer or the MAC layer may perform statistics for each transmitted QoS flow, such as counting ACK/NACK information transmitted by an MAC PDU containing the QoS flow to determine in-synchronization or out-of-synchronization.

In the embodiment of this disclosure, the layer 1 identification information uniquely identifies a terminal equipment, which avoids a problem that operations related to RLM and RLF cannot be performed correctly when more than one layer 2 identifiers correspond to identical layer 1 identifiers, for example, the L1 IDs are lower 8 bits of the L2 IDs, and the physical layer mixes multiple links together in determining in-synchronization and out-of-synchronization.

In one embodiment, the terminal equipment is the terminal equipment of the transmitting end, and the layer 1 identifier is a layer 1 identifier of the terminal equipment of the receiving end; such as a L1 destination ID to which a transmitted sidelink data corresponds, the above link information is a link identifier related to layer 1, the above sidelink service flow information is a QFI or PQI of the service flow, the above layer 2 identifier is a layer 2 identifier of the terminal equipment of the receiving end, such as a source L2 ID or a destination L2 ID, and the terminal equipment identifier is an identifier of the terminal equipment of the receiving end.

In another embodiment, the terminal equipment is the terminal equipment of the receiving end, and the above layer 1 identifier is a layer 1 identifier of the terminal equipment of the transmitting end, such as a source L1 ID obtained from the received SCI, the above link information is a link identifier related to layer 1, the above sidelink service flow information is a QFI or PQI of the service flow, the above layer 2 identifier is a layer 2 identifier of the terminal equipment of the transmitting end, and the terminal equipment identifier is an identifier of the terminal equipment of the transmitting end.

The above operations of the physical layer may also be performed by the MAC layer.

In the embodiment of this disclosure, in operation 202, the higher layer performs radio link monitoring according to the above sidelink information, and when it is determined that an RLF occurs in the corresponding radio link, the higher layer may perform operations related to the radio link failure. For example, the higher layer may report to the upper layer whether the radio link on the sidelink is available for transmission or whether it may meet QoS requirements, etc., and the layer 2 identifier and/or PC5 link identifier and/or the QFI of the service flow and/or the PQI of the service flow to which the radio link corresponds. Here, the higher layer may be an higher layer of the access layer, such as an RRC layer, and the upper layer may also be a non-access layer, such as a V2X layer. However, this embodiment is not limited thereto; for example, the higher layer may also be an MAC layer or an RLC layer or a PDCP layer or an SDAP layer, and a corresponding upper layer may also be an application layer.

In the embodiment of this disclosure, in operation 202, the higher layer may perform the above operations related to radio link monitoring or radio link failure according to the value(s) of the counter and/or timer related to the radio link monitoring related to the sidelink pre-configured or configured by the network device. The values of the counter and/or timer related to the radio link monitoring related to the sidelink may be configured for a unicast link, such as being configured for a PC5 link identifier, or being configured for a peer terminal equipment, such as being configured for a source L2 ID or destination L2 ID or source L1 ID or destination L1 ID, and may be configured for a service flow (QoS flow), such as being configured for a QFI or a PQI; however, this embodiment is not limited thereto.

In one or more embodiments, the value(s) of the counter and/or timer related to the radio link monitoring related to the sidelink may be of one group or more than one groups. When the value(s) of the counter and/or timer related to the radio link monitoring related to the sidelink are of one group, each unicast link or each peer terminal equipment or each service flow corresponds to identical values of the counter and/or timer, and when the value(s) of the counter and/or timer related to the radio link monitoring related to the sidelink are of more than one groups, each unicast link or each peer terminal equipment or each service flow corresponds to one group thereof. Thus, the radio link related to the above sidelink may be monitored via different granularities, and when radio link quality does not satisfy a QoS requirement of a specific unicast link or a specific service, the information on this case may be notified to the upper layer, and the upper layer releases the unicast link or the service.

For example, the configuration information to which the above pre-configuration or the configuration of the network device corresponds may include the identifier of the terminal equipment (which may be an access layer identifier) or the L2 identifier or the L1 identifier or the unicast link identifier or the value(s) of the counter and/or the timer to which the unicast link identifier or the service flow corresponds.

For another example, the configuration information to which the above pre-configuration or the configuration of the network device corresponds may only include one set of values of the counter and/or timer, and the values are applicable to all situations.

For another example, the configuration information to which the above pre-configuration or the configuration of the network device corresponds may further include a threshold corresponding to each unicast link or peer terminal equipment or service flow, such as an in-synchronization threshold (Qin), and out-of-synchronization threshold (Qout), and a block error rate (BLER), etc., and the physical layer of the terminal equipment determines a state of the unicast link or the peer terminal equipment or the service flow according to the threshold to which each unicast link or peer terminal equipment or service flow corresponds.

In the embodiment of this disclosure, the value(s) of the counter and/or timer are operated respectively for each unicast link or peer terminal equipment or service flow.

In the embodiment of this disclosure, the configuration information to which the above pre-configuration or the configuration of the network device corresponds may also be transmitted by the terminal equipment to the peer terminal equipment via a PC5 RRC message.

In the embodiment of this disclosure, there is no restriction on a manner of configuring the value(s) of the counter and/or timer related to the radio link monitoring related to the sidelink. As described above, the value(s) of the counter and/or timer may be pre-configured or configured by the network device. For example, in an embodiment, the network device configures the value(s) of the counter and/or timer related to the radio link monitoring related to the sidelink via dedicated signaling or system information, that is, the network device transmits configuration information via the dedicated signaling or the system information, the configuration information including the value(s) of the counter and/or timer related to the radio link monitoring related to the sidelink, and the terminal equipment may further receive the configuration information transmitted by the network device via the dedicated signaling or system information.

For example, for an in-coverage RRC connected UE, the network device may configure the value(s) of the counter and/or timer for the terminal equipment via the dedicated signaling; for an in-coverage RRC idle/inactive UE, the network device may configure the value(s) of the counter and/or timer via system information; and for an out-of-coverage UE, the value(s) of the counter and/or timer may be pre-configured.

In the embodiment of this disclosure, the above counter includes an N310 counter and/or N311 counter similar to a Uu interface, the above timer includes a T310 timer, and the N310 counter, the N311 counter, and the T310 timer are commonly used counters/timer in standards; however, this embodiment is not limited thereto.

According to the method of the embodiment of this disclosure, distinguishing radio quality on different sidelinks is facilitated, so that the terminal equipment correctly performs operations related to RLM and RLF, which is simple to implement and has little impact on standards.

Embodiment of the Second Aspect

The embodiment of the second aspect of the present application provides a configuration method for a counter and a timer, applicable to a network device. The method is processing at a network device side corresponding to the method of the embodiment of the first aspect, with contents identical to those in the embodiment of the first aspect being not going to be described herein any further.

Figure 4:
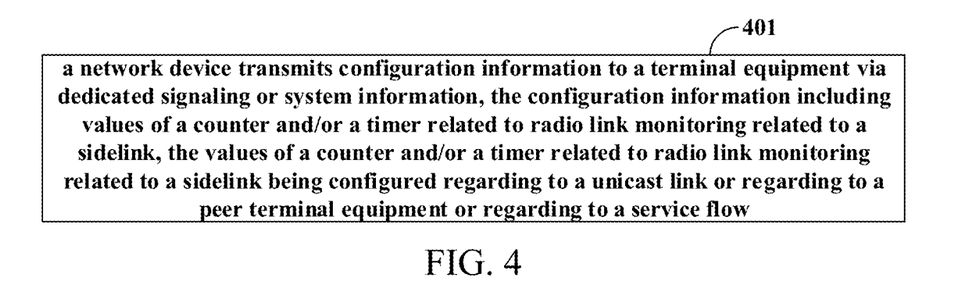
FIG. 4 is a schematic diagram of the method of the second aspect of the embodiments of this disclosure.

FIG. 4 is a schematic diagram of the configuration method for a counter and a timer of the second aspect of the embodiments of the present application. As shown in FIG. 4, the method includes:

operation 401: a network device transmits configuration information to a terminal equipment via dedicated signaling or system information, the configuration information including values of a counter and/or a timer related to radio link monitoring related to a sidelink, the values of a counter and/or a timer related to radio link monitoring related to a sidelink being configured regarding to a unicast link or regarding to a peer terminal equipment or regarding to a service flow.

In at least one embodiment, the value(s) of the counter and/or timer related to the radio link monitoring related to the sidelink may be of one group or more than one groups. When the value(s) of the counter and/or timer related to the radio link monitoring related to the sidelink are of one group, each unicast link or each peer terminal equipment or each service flow corresponds to identical values of the counter and/or timer, and when the value(s) of the counter and/or timer related to the radio link monitoring related to the sidelink are of more than one groups, each unicast link or each peer terminal equipment or each service flow corresponds to one group thereof.

In at least one embodiment, the above counter includes an N310 counter and/or N311 counter similar to a Uu interface, the above timer includes a T310 timer.

Contents of the above counter and/or timer have been described in detail in the embodiment of the first aspect, and shall not be described herein any further.

In at least one embodiment, the configuration information may further include a threshold corresponding to each unicast link or peer terminal equipment or service flow, and the physical layer of the terminal equipment determines a state of the unicast link or the peer terminal equipment or the service flow according to the threshold to which each unicast link or peer terminal equipment or service flow corresponds.

In at least one embodiment, the value(s) of the counter and/or timer are operated respectively for each unicast link or peer terminal equipment or service flow.

In at least one embodiment, the above configuration information may also be transmitted by the terminal equipment to the peer terminal equipment via a PC5 RRC message.

According to the method of the embodiment of this disclosure, the radio link related to the above sidelink may be monitored via different granularities, and when radio link quality does not satisfy a QoS requirement of a specific unicast link or a specific service, the information on this case may be notified to the upper layer, and the upper layer releases the unicast link or the service.

Embodiment of the Third Aspect

The embodiment of the third aspect of the present application provides a radio link monitoring apparatus in a sidelink, configured in a terminal equipment. As principles of the apparatus for solving problems are similar to that of the method of the embodiment of the first aspect, reference may be made to the implementations of the method of the embodiment of the first aspect for implementations of this apparatus, with identical parts being not going to be described herein any further.

Figure 5:
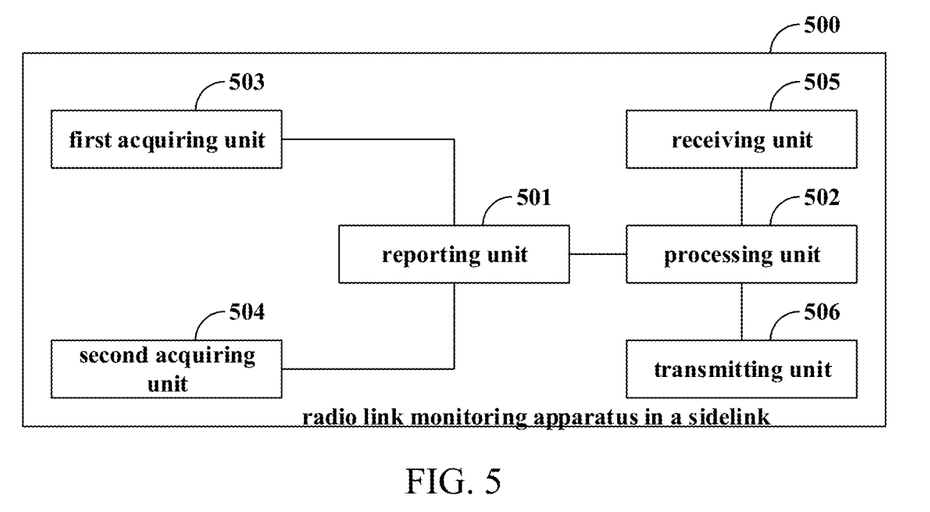
FIG. 5 is a schematic diagram of the apparatus of the third aspect of the embodiments of this disclosure.

FIG. 5 is a schematic diagram of the radio link monitoring apparatus 500 in a sidelink of the third aspect of the embodiments of the present application. As shown in FIG. 5, the apparatus 500 includes a reporting unit 501 and a processing unit 502. The reporting unit 501 reports in a physical layer to a higher layer a state of at least one sidelink and sidelink information to which the state corresponds; and the processing unit 502 performs in the higher layer operations related to radio link monitoring or a radio link failure according to the sidelink information.

In at least one embodiment, the sidelink information includes at least one of the following:
layer 1 identification information;
link information;
sidelink service flow information;
layer 2 identification information;
link identification information of an upper layer; and
identification information of a terminal equipment.

In at least one embodiment, the reporting unit 501 reports the layer 1 identification information, and the processing unit 502 maps the layer 1 identifier to corresponding layer 2 identifier or link identifier of the upper layer, and performs operations related to radio link monitoring or a radio link failure for the layer 2 identifier or the link identifier of the upper layer.

In at least one embodiment, the reporting unit 501 reports the link information, and the processing unit 502 maps link identifier related to layer 1 indicated by the link information to link identifier of the upper layer, and performs operations related to radio link monitoring or a radio link failure for a link to which the link identifier of the upper layer corresponds.

In at least one embodiment, the reporting unit 501 reports the sidelink service flow information, and the processing unit 502 performs operations related to radio link monitoring or a radio link failure for the sidelink service flow.

In at least one embodiment, the reporting unit 501 reports the layer 2 identification information, and the processing unit 502 performs operations related to radio link monitoring or a radio link failure for a link to which the layer 2 identifier corresponds.

In this embodiment, as shown in FIG. 5, the apparatus 500 further includes:
a first acquiring unit 503 configured to acquire in the physical layer the layer 2 identifier, and map the layer 1 identifier to the corresponding layer 2 identifier. For example, the first acquiring unit 503 obtains a correspondence relationship between the layer 2 identifier and the layer 1 identifier from the higher layer, and determines the layer 2 identifier according to the layer 1 identifier and the correspondence relationship. For another example, the first acquiring unit 503 determines the layer 2 identifier according to the layer 1 identifier and a preset rule.

In at least one embodiment, the reporting unit 501 reports the link identification information of the upper layer, and the processing unit 502 performs operations related to radio link monitoring or a radio link failure for a link to which the link identifier of the upper layer corresponds.

In this embodiment, as shown in FIG. 5, the apparatus 500 further includes:
a second acquiring unit 504 configured to acquire in the physical layer the link identifier of the upper layer, and map link identifier related to the layer 1 to the corresponding link identifier of the upper layer. For example, the second acquiring unit 504 obtains a correspondence relationship between the link identifier of the upper layer and the link identifier related to the layer 1 from the higher layer, and determines the link identifier of the upper layer according to the link identifier related to the layer 1 and the correspondence relationship. For another example, the second acquiring unit 504 determines the link identifier of the upper layer according to the link identifier related to the layer 1 and a preset rule.

In at least one embodiment, the reporting unit 501 reports the identification information of the terminal equipment, and the processing unit 502 performs operations related to radio link monitoring or a radio link failure for at least one unicast link or for at least one service flow to which the identifier of the terminal equipment corresponds.

In the embodiment of this disclosure, the layer 1 identification information uniquely identifies a terminal equipment.

In at least one embodiment, the terminal equipment is a terminal equipment of a transmitting end, and the layer 1 identifier is layer 1 identifier of a terminal equipment of a receiving end, the link information is link identifier related to the layer 1, the sidelink service flow information is QFI or PQI of the service flow, the layer 2 identifier is layer 2 identifier of the terminal equipment of the receiving end, and the identifier of the terminal equipment is identifier of the terminal equipment of the receiving end.

In at least one embodiment, the terminal equipment is a terminal equipment of a receiving end, the layer 1 identifier is layer 1 identifier of a terminal equipment of a transmitting end, the link information is link identifier related to the layer 1, the sidelink service flow information is QFI or PQI of the service flow, the layer 2 identifier is layer 2 identifier of the terminal equipment of the transmitting end, and the identifier of the terminal equipment is identifier of the terminal equipment of the transmitting end.

In the embodiment of this disclosure, the operations performed at the physical layer may also be performed at an MAC layer, and a manner of operation is identical to that at the physical layer, which shall not be described herein any further.

In the embodiment of this disclosure, that the processing unit 502 performs operations related to a radio link failure includes that: the processing unit 502 reports the state of the radio link, and the corresponding layer 2 identifier and/or PC5 link identifier and/or the QFI of the service flow and/or the PQI of the service flow, to the upper layer.

In the embodiment of this disclosure, that the processing unit 502 performs operations related to radio link monitoring or a radio link failure includes that: the processing unit 502 performs operations related to radio link monitoring or a radio link failure according to values of a counter and/or a timer related to radio link monitoring related to a sidelink, the values being pre-configured or being configured by the network device. In the embodiment of this disclosure, the values of a counter and/or a timer related to the radio link monitoring related to the sidelink are configured regarding to a unicast link or regarding to a peer terminal equipment or regarding to a service flow.

In at least one embodiment, the values of a counter and/or a timer related to the radio link monitoring related to the sidelink are of one group or more than one groups, when the values of a counter and/or a timer related to the radio link monitoring related to the sidelink are of one group, each unicast link or each peer terminal equipment or each service flow corresponds to identical values of a counter and/or a timer, and when the values of a counter and/or a timer related to the radio link monitoring related to the sidelink are of more than one groups, each unicast link or each peer terminal equipment or each service flow corresponds to one group thereof.

In the embodiment of this disclosure, when the values of a counter and/or a timer related to the radio link monitoring related to the sidelink are configured by the network device, as shown in FIG. 5, the apparatus 500 further includes:

a receiving unit 505 configured to receive configuration information transmitted by the network device via dedicated signaling or system information, the configuration information including the values of a counter and/or a timer related to the radio link monitoring related to the sidelink.

In at least one embodiment, the counter includes an N310 counter and/or an N311 counter, and the timer includes a T310 timer.

In at least one embodiment, the configuration information to which the above pre-configuration or the configuration of the network device corresponds may further include a threshold corresponding to each unicast link or peer terminal equipment or service flow, and the processing unit 502 determines a state of the unicast link or the peer terminal equipment or the service flow according to the threshold corresponding to each unicast link or peer terminal equipment or service flow.

In at least one embodiment, the values of the counter and/or the timer operate respectively for each unicast link or peer terminal equipment or service flow.

In at least one embodiment, as shown in FIG. 5, the apparatus 500 further includes:

a transmitting unit 506 configured to transmit configuration information to which the pre-configuration or the configuration of network device corresponds to a peer terminal equipment via a PC5 RRC message.

According to the apparatus of the embodiment of this disclosure, distinguishing radio quality on different sidelinks is facilitated, so that the terminal equipment correctly performs operations related to RLM and RLF, which is simple to implement and has little impact on standards.

Embodiment of the Fourth Aspect

The embodiment of the fourth aspect of the present application provides a configuration apparatus for a counter and a timer, configured in a network device. As principles of the apparatus for solving problems are similar to that of the method of the embodiment of the second aspect, reference may be made to the implementations of the method of the embodiment of the second aspect for implementations of this apparatus, with identical parts being not going to be described herein any further.

Figure 6:
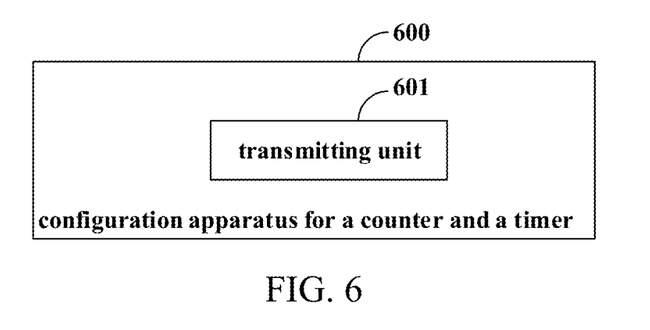
FIG. 6 is a schematic diagram of the apparatus of the fourth aspect of the embodiments of this disclosure.

FIG. 6 is a schematic diagram of the configuration apparatus 600 for a counter and a timer of this embodiments. As shown in FIG. 6, the apparatus 600 includes a transmitting unit 601 configured to transmit configuration information to a terminal equipment via dedicated signaling or system information, the configuration information including values of a counter and/or a timer related to radio link monitoring related to a sidelink, the values of a counter and/or a timer related to radio link monitoring related to a sidelink being configured regarding to a unicast link or regarding to a peer terminal equipment or regarding to a service flow.

In at least one embodiment, the values of a counter and/or a timer related to the radio link monitoring related to the sidelink are of one group or more than one group, when the values of a counter and/or a timer related to the radio link monitoring related to the sidelink are of one group, each unicast link or each peer terminal equipment or each service flow corresponds to identical values of a counter and/or a timer, and when the values of a counter and/or a timer related to the radio link monitoring related to the sidelink are of more than one group, each unicast link or each peer terminal equipment or each service flow corresponds to one group thereof.

In at least one embodiment, the counter includes an N310 counter and/or an N311 counter, and the timer includes a T310 timer.

In at least one embodiment, the configuration information may further include a threshold corresponding to each unicast link or peer terminal equipment or service flow, and the physical layer of the terminal equipment determines a state of the unicast link or the peer terminal equipment or the service flow according to the threshold corresponding to each unicast link or peer terminal equipment or service flow.

In at least one embodiment, the values of the counter and/or the timer operate respectively for each unicast link or peer terminal equipment or service flow.

In at least one embodiment, the configuration information may also be transmitted by the terminal equipment to the peer terminal equipment via a PC5 RRC message.

According to the apparatus of the embodiment of this disclosure, the radio link related to the above sidelink may be monitored via different granularities, and when radio link quality does not satisfy a QoS requirement of a specific unicast link or a specific service, the information on this case may be notified to the upper layer, and the upper layer releases the unicast link or the service.

Embodiment of the Fifth Aspect

The embodiment of the fifth aspect of the present application provides a terminal equipment, including the apparatus described in the embodiment of the third aspect.

Figure 7:
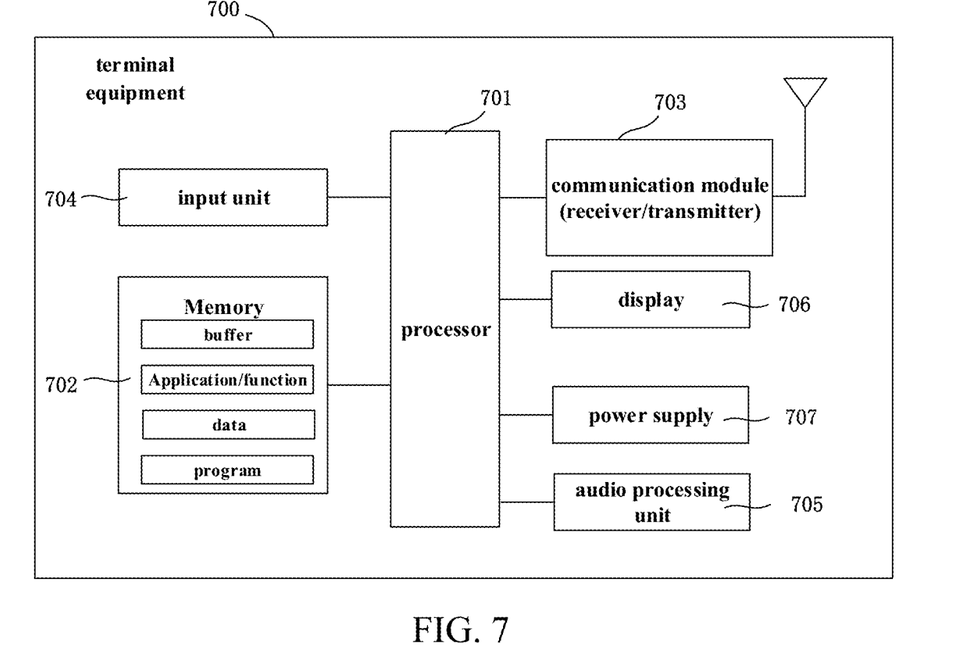
FIG. 7 is a schematic diagram of the terminal equipment of the fifth aspect of the embodiments of this disclosure.

FIG. 7 is a schematic diagram of the terminal equipment of the embodiment of the fifth aspect of the present application. As shown in FIG. 7, the terminal equipment 700 may include a central processing unit 701 and a memory 702, the memory 702 being coupled to the central processing unit 701. It should be noted that this figure is illustrative only, and other types of structures may also be used, so as to supplement or replace this structure and achieve a telecommunications function or other functions.

In an embodiment, the functions of the apparatus described in the embodiment of the third aspect may be integrated into the central processing unit 701, and the central processing unit 701 executes functions of the apparatus described in the embodiment of the third aspect. The functions of the apparatus described in the embodiment of the third aspect are incorporated herein, and shall not be described herein any further.

In another embodiment, the apparatus described in the embodiment of the third aspect and the central processing unit 701 are configured separately; for example, the apparatus described in the embodiment of the third aspect may be configured as a chip connected to the central processing unit 701, and the functions of the apparatus described in the embodiment of the third aspect are executed under control of the central processing unit 701.

As shown in FIG. 7, in one or more embodiments, the terminal equipment 700 may further include a communication module 703, an input unit 704, an audio processing unit 705, a display 706 and a power supply 707. It should be noted that the terminal equipment 700 does not necessarily include all the parts shown in FIG. 7. Furthermore, in other embodiments, the terminal equipment 700 may include parts not shown in FIG. 7, and the related art may be referred to.

As shown in FIG. 7, the central processing unit 701 is sometimes referred to as a controller or an operational control, which may include a microprocessor or other processor devices and/or logic devices. The central processing unit 701 receives input and controls operations of components of the terminal equipment 700.

The memory 702 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 701 may execute programs stored in the memory 702, so as to realize information storage or processing, etc. Functions of other parts are similar to those of the related art, which shall not be described herein any further. The parts of the terminal equipment 700 may be realized by specific hardware, firmware, software, or any combination thereof, without departing from the scope of this disclosure.

With the terminal equipment of this embodiment, the method of the embodiment of the first aspect is used, distinguishing radio quality on different sidelinks is facilitated, so that the terminal equipment correctly performs operations related to RLM and RLF, which is simple to implement and has little impact on standards.

Embodiment of the Sixth Aspect

The embodiment of the sixth aspect of the present application provides a network device, including the apparatus described in the embodiment of the fourth aspect.

Figure 8:
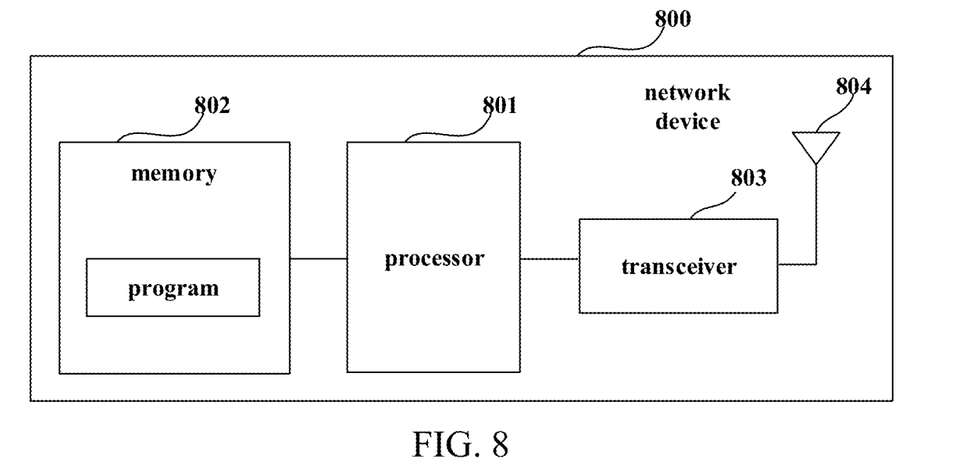
FIG. 8 is a schematic diagram of the network device of the sixth aspect of the embodiments of this disclosure.

FIG. 8 is a schematic diagram of the network device of the embodiment of the sixth aspect of the present application. As shown in FIG. 8, the network device 800 may include a central processing unit (CPU) 801 and a memory 802, the memory 802 being coupled to the central processing unit 801. The memory 802 may store various data, and furthermore, it may store a program for data processing, and execute the program under control of the central processing unit 801, so as to receive various information transmitted by a terminal equipment, and transmit various information to the terminal equipment.

In one embodiment, the functions of the apparatus described in the embodiment of the fourth aspect may be integrated into the central processing unit 801, and the central processing unit 801 executes functions of the apparatus described in the embodiment of the fourth aspect. The functions of the apparatus described in the embodiment of the fourth aspect are incorporated herein, and shall not be described herein any further.

In another embodiment, the apparatus described in the embodiment of the fourth aspect and the central processing unit 801 are configured separately; for example, the apparatus described in the embodiment of the fourth aspect may be configured as a chip connected to the central processing unit 801, and the functions of the apparatus described in the embodiment of the fourth aspect are executed under control of the central processing unit 801.

Furthermore, as shown in FIG. 8, the network device 800 may include a transceiver 803, and an antenna 804, etc. Functions of the above components are similar to those in the related art, and shall not be described herein any further. It should be noted that the network device 800 does not necessarily include all the parts shown in FIG. 8. Furthermore, the network device 800 may include parts not shown in FIG. 8, and the related art may be referred to.

According to the network device of the embodiment of this disclosure, the radio link related to the above sidelink may be monitored via different granularities, and when radio link quality does not satisfy a QoS requirement of a specific unicast link or a specific service, the information on this case may be notified to the upper layer, and the upper layer releases the unicast link or the service.

Embodiment of the Seventh Aspect

The embodiment of the seventh aspect of the present application provides a communication system, including a network device and a terminal equipment. The network device is, for example, the network device 800 described in the embodiment of the sixth aspect, and the terminal equipment is, for example, the terminal equipment 700 described in the embodiment of the fifth aspect.

In this embodiment, the terminal equipment is, for example, a UE served by a gNB, and may include conventional compositions and functions of a terminal equipment in addition to the functions of the apparatus described in the embodiment of the third aspect, which are as described in the embodiment of the fifth aspect, and shall not be described herein any further.

In this embodiment, the network device may be, for example, a gNB in NR, and may include conventional compositions and functions of a network device in addition to the functions of the apparatus described in the embodiment of the fourth aspect, which are as described in the embodiment of the sixth aspect, and shall not be described herein any further.

With the communication system of this embodiment, distinguishing radio quality on different sidelinks is facilitated, so that the terminal equipment correctly performs operations related to RLM and RLF, which is simple to implement and has little impact on standards.

An embodiment of this disclosure provides a computer readable program, which, when executed in a terminal equipment, will cause a computer to carry out the method described in the embodiment of the first aspect in the terminal equipment.

An embodiment of this disclosure provides a storage medium storing a computer readable program, which will cause a computer to carry out the method described in the embodiment of the first aspect in a terminal equipment.

An embodiment of this disclosure provides a computer readable program, which, when executed in a network device, will cause a computer to carry out the method described in the embodiment of the second aspect in the network device.

An embodiment of this disclosure provides a storage medium storing a computer readable program, which will cause a computer to carry out the method described in the embodiment of the second aspect in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 5 and 6 may either correspond to software modules of procedures of a computer program, or correspond to hardware modules. Such software modules may respectively correspond to the steps shown in FIGS. 2 and 4. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 5 and 6 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 5 and 6 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to implementations containing the above embodiments, following supplements are further disclosed.

1. A radio link monitoring apparatus in a sidelink, configured in a terminal equipment, the apparatus including:
   a reporting unit configured to report in a physical layer to a higher layer a state of at least one sidelink and sidelink information to which the state corresponds; and
   a processing unit configured to perform in the higher layer operations related to radio link monitoring or a radio link failure according to the sidelink information.

2. The apparatus according to supplement 1, wherein the sidelink information includes at least one of the following:
   layer 1 identification information;
   link information;
   sidelink service flow information;
   layer 2 identification information;
   link identification information of an upper layer; and
   identification information of a terminal equipment.

3. The apparatus according to supplement 2, wherein,
   the reporting unit reports the layer 1 identification information, and the processing unit maps the layer 1 identifier to corresponding layer 2 identifier or link identifier of the upper layer, and performs the operations related to radio link monitoring a radio link failure for the layer 2 identifier or the link identifier of the upper layer; or
   the reporting unit reports the link information, and the processing unit maps link identifier related to layer 1 indicated by the link information to link identifier of the upper layer, and performs the operations related to radio link monitoring or a radio link failure for a link to which the link identifier of the upper layer corresponds; or
   the reporting unit reports the sidelink service flow information, and the processing unit performs the operations related to radio link monitoring or a radio link failure for the sidelink service flow; or the reporting unit reports the layer 2 identification information, and the processing unit performs the operations related to radio link monitoring or a radio link failure for a link to which the layer 2 identifier corresponds; or the reporting unit reports the link identification information of the upper layer, and the processing unit performs the operations related to radio link monitoring or a radio link failure for a link to which the link identifier of the upper layer corresponds; or the reporting unit reports the identification information of the terminal equipment, and the processing unit performs the operations related to radio link monitoring or a radio link failure for at least one unicast link or for at least one service flow to which the identifier of the terminal equipment corresponds.

4. The apparatus according to supplement 2, wherein the layer 1 identification information uniquely identifies a terminal equipment.

5. The apparatus according to any one of supplements 2-4, wherein the terminal equipment is a terminal equipment of a transmitting end, and the layer 1 identifier is layer 1 identifier of a terminal equipment of a receiving end, the link information is link identifier related to the layer 1, the sidelink service flow information is QFI or PQI of the service flow, the layer 2 identifier is layer 2 identifier of the terminal equipment of the receiving end, and the identifier of the terminal equipment is identifier of the terminal equipment of the receiving end.

6. The apparatus according to any one of supplements 2-4, wherein the terminal equipment is a terminal equipment of a receiving end, the layer 1 identifier is layer 1 identifier of a terminal equipment of a transmitting end, the link information is link identifier related to the layer 1, the sidelink service flow information is QFI or PQI of the service flow, the layer 2 identifier is layer 2 identifier of the terminal equipment of the transmitting end, and the identifier of the terminal equipment is identifier of the terminal equipment of the transmitting end.

7. The apparatus according to supplement 2 or 3, wherein if the reporting unit reports the layer 2 identification information, the apparatus further includes:

a first acquiring unit configured to acquire in the physical layer the layer 2 identifier, and map the layer 1 identifier to the corresponding layer 2 identifier.

8. The apparatus according to supplement 7, wherein that the first acquiring unit acquires the layer 2 identifier includes that:

the first acquiring unit obtains a correspondence relationship between the layer 2 identifier and the layer 1 identifier from the higher layer, and determines the layer 2 identifier according to the layer 1 identifier and the correspondence relationship; or the first acquiring unit determines the layer 2 identifier according to the layer 1 identifier and a preset rule.

9. The apparatus according to supplement 2 or 3, wherein if the reporting unit reports the link identification information of the upper layer, the apparatus further includes:

a second acquiring unit configured to acquire in the physical layer the link identifier of the upper layer, and map link identifier related to the layer 1 to the corresponding link identifier of the upper layer.

10. The apparatus according to supplement 9, wherein that the second acquiring unit acquires the link identifier of the upper layer includes that:

the second acquiring unit obtains a correspondence relationship between the link identifier of the upper layer and the link identifier related to the layer 1 from the higher layer, and determines the link identifier of the upper layer according to the link identifier related to the layer 1 and the correspondence relationship; or the second acquiring unit determines the link identifier of the upper layer according to the link identifier related to the layer 1 and a preset rule.

11. The apparatus according to any one of supplements 1-10, wherein that the processing unit performs operations related to a radio link failure includes that:

the processing unit reports the state of the radio link, and the corresponding layer 2 identifier and/or PC5 link identifier and/or the QFI of the service flow and/or the PQI of the service flow, to the upper layer.

12. The apparatus according to any one of supplements 1-10, wherein that the processing unit performs operations related to radio link monitoring or a radio link failure includes that:

the processing unit performs the operations related to radio link monitoring or a radio link failure according to values of a counter and/or a timer related to radio link monitoring related to a sidelink, the values being pre-configured or being configured by the network device;

wherein the values of a counter and/or a timer related to the radio link monitoring related to the sidelink are configured regarding to a unicast link or regarding to a peer terminal equipment or regarding to a service flow.

13. The apparatus according to supplement 12, wherein the values of a counter and/or a timer related to the radio link monitoring related to the sidelink are of one group or more than one group, and when the values of a counter and/or a timer related to the radio link monitoring related to the sidelink are of more than one group, each unicast link or each peer terminal equipment or each service flow corresponds to one group thereof.

14. The apparatus according to supplement 12, wherein when the values of a counter and/or a timer related to the radio link monitoring related to the sidelink are configured by the network device, the apparatus further includes:

a receiving unit configured to receive configuration information transmitted by the network device via dedicated signaling or system information, the configuration information including the values of a counter and/or a timer related to the radio link monitoring related to the sidelink.

15. The apparatus according to any one of supplements 12-14, wherein the counter includes an N310 counter and/or an N311 counter, and the timer includes a T310 timer.

16. The apparatus according to supplement 12, wherein the configuration information to which the pre-configuration or the configuration of the network device corresponds includes a threshold corresponding to each unicast link or peer terminal equipment or service flow, and the processing unit determines a state of the unicast link or the peer terminal equipment or the service flow according to the threshold corresponding to each unicast link or peer terminal equipment or service flow.

17. The apparatus according to supplement 16, wherein the values of the counter and/or the timer operate respectively for each unicast link or peer terminal equipment or service flow.

18. The apparatus according to supplement 12, wherein the apparatus further includes: a transmitting unit configured to transmit configuration information to which the pre-configuration or the configuration of network device corresponds to a peer terminal equipment via a PC5 RRC message.

19. A configuration apparatus for a counter and a timer, configured in a network device, the apparatus including:
a transmitting unit configured to transmit configuration information to a terminal equipment via dedicated signaling or system information, the configuration information including values of a counter and/or a timer related to radio link monitoring related to a sidelink, the values of a counter and/or a timer related to radio link monitoring related to a sidelink being configured regarding to a unicast link or regarding to a peer terminal equipment or regarding to a service flow.

20. The apparatus according to supplement 19, wherein the values of a counter and/or a timer related to the radio link monitoring related to the sidelink are of one group or more than one group, and when the values of a counter and/or a timer related to the radio link monitoring related to the sidelink are of more than one group, each unicast link or each peer terminal equipment or each service flow corresponds to one group thereof.

21. The apparatus according to supplement 19 or 20, wherein the counter includes an N310 counter and/or an N311 counter, and the timer includes a T310 timer.

22. The apparatus according to supplement 19, wherein the configuration information to which the pre-configuration or the configuration of the network device corresponds includes a threshold corresponding to each unicast link or peer terminal equipment or service flow, and the processing unit judges a state of the unicast link or the peer terminal equipment or the service flow according to the threshold corresponding to each unicast link or peer terminal equipment or service flow.

23. The apparatus according to supplement 22, wherein the values of the counter and/or the timer operate respectively for each unicast link or peer terminal equipment or service flow.

24. A communication system, including a terminal equipment and a network device, the terminal equipment including the apparatus as described in any one of supplements 1-18, and/or the network device including the apparatus as described in any one of supplements 19-23.

What is claimed is:

1. A radio link monitoring apparatus in a sidelink, configured in a terminal equipment, the apparatus comprising:
a memory, and
processor circuitry coupled to the memory and configured to
report, in a MAC layer to a RRC layer, a state of at least one sidelink and sidelink information to which the state corresponds; and
perform in the RRC layer, operations related to radio link monitoring or a radio link failure according to the sidelink information.

2. The apparatus according to claim 1, wherein the sidelink information comprises at least one of the following:
layer 1 identification information;
link information;
sidelink service flow information;
layer 2 identification information;
link identification information of an upper layer; and
identification information of a terminal equipment.

3. The apparatus according to claim 2, wherein,
the processor circuitry reports the layer 1 identification information, and maps the layer 1 identifier to corresponding layer 2 identifier or link identifier of the upper layer, and performs the operations related to radio link monitoring a radio link failure for the layer 2 identifier or the link identifier of the upper layer; or
the processor circuitry reports the link information, and maps link identifier related to layer 1 indicated by the link information to link identifier of the upper layer, and performs the operations related to radio link monitoring or a radio link failure for a link to which the link identifier of the upper layer corresponds; or
the processor circuitry reports the sidelink service flow information, and performs the operations related to radio link monitoring or a radio link failure for the sidelink service flow; or
the processor circuitry reports the layer 2 identification information, and performs the operations related to radio link monitoring or a radio link failure for a link to which the layer 2 identifier corresponds; or
the processor circuitry reports the link identification information of the upper layer, and performs the operations related to radio link monitoring or a radio link failure for a link to which the link identifier of the upper layer corresponds; or
the processor circuitry reports the identification information of the terminal equipment, and performs the operations related to radio link monitoring or a radio link failure for at least one unicast link or for at least one service flow to which the identifier of the terminal equipment corresponds.

4. The apparatus according to claim 2, wherein the terminal equipment is a terminal equipment of a transmitting end, and the layer 1 identifier is layer 1 identifier of a terminal equipment of a receiving end, the link information is link identifier related to the layer 1, the sidelink service flow information is QFI or PQI of the service flow, the layer 2 identifier is layer 2 identifier of the terminal equipment of the receiving end, and the identifier of the terminal equipment is identifier of the terminal equipment of the receiving end.

5. The apparatus according to claim 2, wherein the terminal equipment is a terminal equipment of a receiving end, the layer 1 identifier is layer 1 identifier of a terminal equipment of a transmitting end, the link information is link identifier related to the layer 1, the sidelink service flow information is QFI or PQI of the service flow, the layer 2 identifier is layer 2 identifier of the terminal equipment of the transmitting end, and the identifier of the terminal equipment is identifier of the terminal equipment of the transmitting end.

6. The apparatus according to claim 2, wherein if the processor circuitry reports the layer 2 identification information, the processor circuitry further acquires in the MAC layer the layer 2 identifier, and map the layer 1 identifier to the corresponding layer 2 identifier.

7. The apparatus according to claim 6, wherein that the processor circuitry acquires the layer 2 identifier comprises that:
the processor circuitry obtains a correspondence relationship between the layer 2 identifier and the layer 1 identifier from the RRC layer, and determines the layer 2 identifier according to the layer 1 identifier and the correspondence relationship; or
the processor circuitry determines the layer 2 identifier according to the layer 1 identifier and a preset rule.

8. The apparatus according to claim 2, wherein if the processor circuitry reports the link identification information of the upper layer, the processor circuitry further acquires in the MAC layer the link identifier of the upper layer, and map link identifier related to the layer 1 to the corresponding link identifier of the upper layer.

9. The apparatus according to claim 8, wherein that the processor circuitry acquires the link identifier of the upper layer comprises that:
   the processor circuitry obtains a correspondence relationship between the link identifier of the upper layer and the link identifier related to the layer 1 from the RRC layer, and determines the link identifier of the upper layer according to the link identifier related to the layer 1 and the correspondence relationship; or
   the processor circuitry determines the link identifier of the upper layer according to the link identifier related to the layer 1 and a preset rule.

10. The apparatus according to claim 1, wherein that the processor circuitry performs operations related to a radio link failure comprises that:
   the processor circuitry reports the state of the radio link, and the corresponding layer 2 identifier and/or PC5 link identifier and/or the QFI of the service flow and/or the PQI of the service flow, to an upper layer.

11. The apparatus according to claim 1, wherein the processor circuitry further determines the state of at least one sidelink, in the MAC layer, according to values of a counter and/or a timer related to radio link monitoring related to a sidelink, wherein, the counter and/or the timer is pre-configured or is configured by a network device.

12. The apparatus according to claim 11, wherein the values of a counter and/or a timer related to the radio link monitoring related to the sidelink are of one group or more than one group, and when the values of a counter and/or a timer related to the radio link monitoring related to the sidelink are of more than one group, each unicast link or each peer terminal equipment or each service flow corresponds to one group thereof.

13. The apparatus according to claim 11, wherein when the values of a counter and/or a timer related to the radio link monitoring related to the sidelink are configured by the network device, the apparatus further comprises:
   a receiver configured to receive configuration information transmitted by the network device via dedicated signaling or system information, the configuration information comprising the values of a counter and/or a timer related to the radio link monitoring related to the sidelink.

14. The apparatus according to claim 11, wherein the counter comprises an N310 counter and/or an N311 counter, and the timer comprises a T310 timer.

15. The apparatus according to claim 11, wherein the values of the counter and/or the timer operate respectively for each unicast link or peer terminal equipment or service flow.

16. The apparatus according to claim 11, wherein the apparatus further comprises:
   a transmitter configured to transmit configuration information to which the pre-configuration or the configuration the network device corresponds to a peer terminal equipment via a PC5 RRC message.

17. A configuration apparatus for a counter and a timer, configured in a network device, the apparatus comprising:
   a transmitter configured to transmit configuration information to a terminal equipment via dedicated signaling or system information, the configuration information comprising values of a counter related to radio link monitoring related to a sidelink,
   wherein the configuration information is received by the terminal equipment in a RRC connected state via the dedicated signaling, or the configuration information is received by the terminal equipment in a RRC idle or inactive state via the system information.

18. The apparatus according to claim 17, wherein the values of a counter related to the radio link monitoring related to the sidelink are of one group or more than one group, and when the values of a counter related to the radio link monitoring related to the sidelink are of more than one group, each unicast link or each peer terminal equipment or each service flow corresponds to one group thereof.

19. The apparatus according to claim 17, wherein the counter comprises an N310 counter and/or an N311 counter.

20. A communication system, comprising:
   a terminal equipment, and a network device,
   the terminal equipment comprising:
   processor circuitry configured to report, in a MAC layer to a RRC layer, a state of at least one sidelink and sidelink information to which the state corresponds; perform in the RRC layer, operations related to radio link monitoring or a radio link failure according to the sidelink information, and/or
   the network device including a configuration apparatus for a counter and a timer, the apparatus comprising:
   a transmitter configured to transmit configuration information to the terminal equipment via dedicated signaling or system information, the configuration information comprising values of a counter related to radio link monitoring related to a sidelink,
   wherein the configuration information is received by the terminal equipment in a RRC connected state via the dedicated signaling, or the configuration information is received by the terminal equipment in a RRC idle or inactive state via the system information.

\* \* \* \* \*